United States Patent

[11] 3,543,634

| [72] | Inventor | Vernon E. Allen<br>Middleburg Heights, Ohio |
|---|---|---|
| [21] | Appl. No. | 807,475 |
| [22] | Filed | Jan. 27, 1969<br>Continuation of Ser. No. 628,600,<br>Apr. 5, 1967, abandoned. |
| [45] | Patented | Dec. 1, 1970 |
| [73] | Assignee | Eaton Yate & Towne, Inc.<br>Cleveland, Ohio<br>a corporation of Ohio |

[54] PUSH-ON-FASTENING DEVICE
1 Claim, 8 Drawing Figs.

[52] U.S. Cl. .................................................. 85/36
[51] Int. Cl. .......................................... F16b 17/00
[50] Field of Search .......................................... 85/36

[56] References Cited
UNITED STATES PATENTS

| 2,636,235 | 4/1953 | Nygard | 85/36 |
| 2,798,406 | 7/1957 | Steck | 85/36 |
| 2,895,370 | 7/1959 | Hamann | 85/36 |
| 3,387,529 | 6/1968 | Flora | 85/36 |

FOREIGN PATENTS

| 1,428,666 | 1/1966 | France | 85/36 |
| 1,468,494 | 12/1966 | France | 85/36 |

*Primary Examiner*—Marion Parsons, Jr.
*Attorney*—Teare, Teare and Sammon

ABSTRACT: A fastening device for securement with a stud or the like comprising a base having an elongated opening and a pair of spaced, inclined resilient fingers extending upwardly from the base adjacent one end of the opening for gripping engagement with the stud when disposed in "push-on" relation thereon. The other end of the opening defining a clearance area for receiving the stud therein when slidably removed from the fingers so that the device may be lifted off and removed from the stud.

Patented Dec. 1, 1970

3,543,634

INVENTOR
VERNON E. ALLEN

BY Teare, Teare & Sammon

ATTORNEYS

3,543,634

PUSH-ON-FASTENING DEVICE

BACKGROUND OF THE INVENTION

This application is a continuation of copending U.S. Pat. application, Ser. No. 628,600 filed April 5, 1967, now abandoned.

This invention relates to fastening devices and more particularly relates to an improved construction for a fastening device for securement with a stud, bolt or the like for mounting and/or supporting another component, such as speaker mounts, trim, breaker strips, instrument mountings and the like.

Heretofore, it has been known to provide spring type devices which have included yieldable tongues for engagement with studs, bolts or the like by endwise movement of the bolt through the device. Such devices, however, have been limited in use to threaded or specially shouldered studs to effect the locking action. Such devices have been time consuming and difficult to remove without distortion or damage to the fastener or stud or have resulted in a loss of holding power. Accordingly, such devices have not been satisfactory, particularly after repeated usage.

A device somewhat similar to that herein described, but which is different in construction and operation is described in the patent to George A. Tinnerman, U.S. Pat. No. 1,971,881.

SUMMARY OF THE INVENTION

A fastening device for securement with a stud, bolt or the like, comprising a base having an elongated opening therein. A pair of spaced, oppositely disposed inclined resilient fingers extending upwardly from the base adjacent one end of the opening adapted to receive therebetween the stud when pushed downwardly thereon for gripping engagement with the stud. The other end of the opening providing a clearance area adapted to receive the stud when slidably removed from between the fingers so that the device may be lifted off and removed from stud. The base of the device further includes a flanged engagement surface for engagement by a work tool for slidably removing the stud from between the fingers upon application of pressure to the stud and the flanged engagement surface. In another form, the base of the device is formed to include a resilient spring arm which coacts with a support member for resiliently holding another component part in supported relation relative to the support member.

The fastening device of the present invention provides a low-cost attachment which is easy to apply, which incorporates excellent holding power and vibration resistance. The device is particularly unique in its ability to be easily removed with an ordinary work tool, such as pliers, so that it may be removed and reused repeatedly without distortion or damage to the fastener or stud or without a loss of holding power.

DESCRIPTION OF THE PREFERRED EMBODIMENTS

Referring again to the drawings, and in particular to FIGS. 1 to 3 and 5 to 8 thereof, there is illustrated one form of the "push-on" type fastening device, designated generally at 2, for application to a member S such as a stud, bolt or the like, for mounting two or more parts P and P', such as apertured panels, in superposed relationship. Such device is of a unitary, one-piece construction which may be made from a piece, sheet or strip of sheet metal having spring-like characteristics, such as spring steel or the like.

Figure 2:
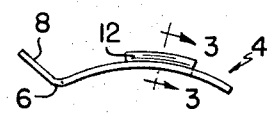
FIG. 2 is a side elevation view looking from the left-hand side of the device shown in FIG. 1.

In one form, the device comprises a body or base 4 which may have a curved or arched (concaval-convex) shape in side elevation, as seen in FIG. 2. The base 4 includes a pair of oppositely disposed end portions 5 which are connected together by a relatively narrow bridge portion 7. One end of the base 4 terminates in an upturned flange 8 which is bent upwardly and outwardly, as at 6, and which is inclined relative to the general plane of the base to provide an engagement surface to facilitate removal of the device, as will hereinafter be more fully described.

Figure 6:
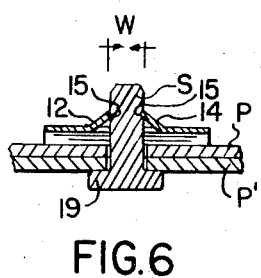
FIG. 6 is a fragmentary vertical section view taken along the plane of line 6–6 of FIG. 5.

The base 4 is struck out between the bridge portions 7 to provide an elongated, polygonal, such as rectangular, opening or slot 10 which is coextensive in length with the bridge portions 7. A pair of spaced, oppositely disposed, resiliently inclined fingers 12 and 14 are made integral with the base 4 and extend angularly upwardly therefrom adjacent opposed marginal edges of the slot 10. As shown, the fingers 12 and 14 are substantially equal in length and are inclined so as to lie in planes which are disposed at an angle ($a$) to the general plane of base 4. By this arrangement, the lower opposed edges of the respective fingers 12 and 14 provide a slight digging and gripping action on the material of the stud S in the assembled position of the device, as seen in FIG. 6. The sharp edges which define the lower opposed edges of the fingers 12 and 14 facilitate such digging action into the stud material.

In the form shown, the transverse dimension A between the opposed upper free ends of the fingers 12 and 14 is less than the maximum transverse dimension W (diameter) of the stud S. By this arrangement, the fingers 12 and 14 flex or spread laterally outwardly away from one another upon insertion of the stud S therethrough. In addition, the length of the fingers 12 and 14 is preferably greater than the maximum transverse dimension of the stud S so as to provide an effective line contact of the lower edges of the fingers with the confronting surface of the stud.

In the invention, the tightness with which the stud S is retained may be achieved either by increasing the angle ($a$) which decreases the transverse dimension A between the end edges of the fingers 12 and 14 or by maintaining this angle constant, but increasing the width of the fingers which provides a reduction in the transverse dimension A. In practice, variation in the angle ($a$) is preferred to achieve increased gripping action on the stud S.

Figure 1:
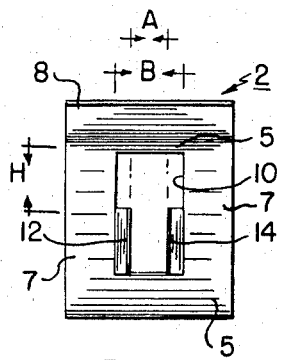
FIG. 1 is a top plan view of the fastening device made in accordance with the invention.
Figure 8:
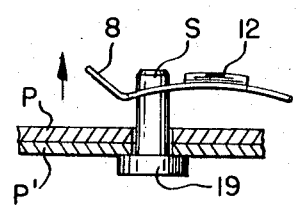
FIG. 8 is a fragmentary view, partly in section, showing the device as it is being lifted off and removed from the secured engagement with the stud.

As best seen in FIG. 1, the slot 10 is slightly enlarged with respect to the maximum transverse dimension W of the stud S at the end remote from the fingers 12 and 14. Preferably, the enlarged area of the slot is polygonal, such as rectangular or square in shape. Accordingly, it is preferred that this enlarged portion of the slot have a transverse dimension or width B which is greater than the maximum transverse dimension W of the stud so that the stud may be slidably received within this enlarged portion which acts as a clearance area so that the device may be lifted axially off and removed from the stud, as best seen in FIG. 8. Accordingly, the transverse dimension or width B of the slot 10 in this enlarged portion is greater than the maximum transverse dimension A between the opposed free ends of the fingers 12 and 14.

By way of specific example, but not of limitation, for a stud having a diameter of 0.125 inches, the device may have a length of 0.48 inches and a width of 0.38 inches. The length of the slot at the enlarged portion H may be 0.16 inches and the transverse dimension or width B of the slot 10 may be 0.19 inches. For a stud having a diameter of 0.187 inches or 0.250 inches, the length of the device may be 0.69 inches and the width 0.50 inches. For the 0.187 inch stud, the dimension H and B may be 0.25 inches while for a stud with a diameter of 0.25 inches, the dimension H may be 0.28 inches and the dimension B may be 0.30 inches. For a stud having a diameter of 0.125 inches, the thickness of the base of the device may be 0.011 inches, 0.014 inches. For the 0.187 inch and 0.250 inch stud the thickness of the base of the device may be 0.017 inches, as desired. The relative holding power of the device increases with an increase in thickness of the device.

In typical application, the panels P and P' may be disposed in superposed relation with the apertures 3 and 5 alined in registration with one another so as to receive the stud S therethrough. Thus assembled, the fastening device 2 is then simply "pushed on" to the stud so that the latter is inserted between the spaced, inclined fingers 12 and 14. This movement resiliently flexes or spreads the fingers 12 and 14 outwardly away from one another until the opposed ends 5 of the base are brought into abutting engagement with the confronting upper surface of the panel P. The curved or arched shape of the base 4 imparts a resilient gripping of the device with respect to the stud so that the base may tend to slightly flatten out in a direction toward the panel P. This arrangement provides an effective spring action for holding the parts in gripping relationship with one another. After the device has been moved axially downwardly onto the stud S, the fingers 12 and 14 due to their resiliency tend to flex inwardly toward one another and into tight digging engagement with the material of the stud, as seen in FIG. 6. By the spatial arrangement and inclination of the fingers 12 and 14 there is provided an effective gripping action along a line contact with the stud for imparting an excellent holding power for holding the panels in superposed relationship. Moreover, the parts are not easily loosened and incorporate excellent vibration resistance.

To remove the device, the suitable work tool T, such as a pair of jawed pliers, may be applied so that the one jaw is engaged with the flange 8 while the other jaw is engaged with the stud S. A squeezing pressure may then be applied to the tool which automatically slides the device in a lateral direction (as shown by the arrow in FIG. 7). This sliding action enables the stud S to be removed from the gripping engagement between the fingers 12 and 14 so that the stud is moved into and received by the clearance area defined by the enlarged portion of the slot 10, whereupon, the device may be simply lifted off and removed from the stud, as seen in FIG. 8. By this arrangement, there is no distortion or damage to the device so that it may be removed and reused and repeatedly for subsequent applications. In addition, the stud is also able to receive the same or other similar such fastening devices repeatedly due to the reduced wear and/or damage thereon from repeated installations of the fastening device.

Figure 3:
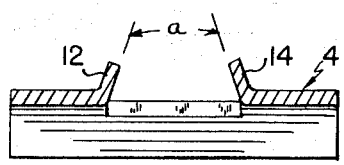
FIG. 3 is an enlarged vertical section view taken along the plane of line 3–3 of FIG. 2.
Figure 4:
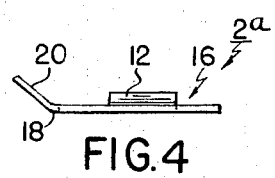
FIG. 4 is a side elevation view showing a modification of the fastening device made in accordance with the invention.
Figure 5:
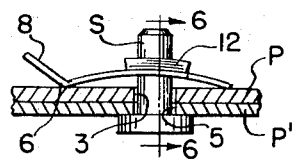
FIG. 5 is a fragmentary side elevation view, partly in section, showing the fastening device of the invention in secured engagement with a stud for holding repair of support members, such as panels, and in superposed relationship.
Figure 7:
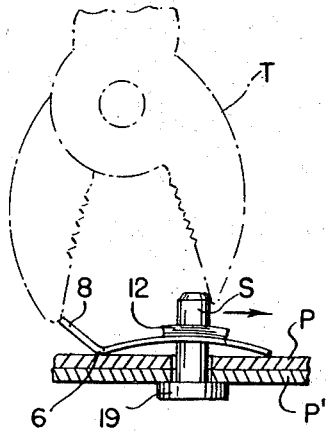
FIG. 7 is a fragmentary view, partly in section, showing a suitable work tool in broken lines for slidably removing the device from secured engagement with the stud.

In FIG. 4 there is shown a modification of the fastening device which is generally similar to that described in connection with FIGS. 1 to 3, except that the device 2a in the embodiment shown has the base 16 which is not of a curved or arched construction. In this form, the base 16 is of a flat or planar construction, in elevation, and which also has a flange 20 bent upwardly therefrom, as at 18, to provide a gripping surface for the purposes, as aforesaid.

Thus, while preferred embodiments of the invention have been illustrated herein, it is to be understood that other modifications and variations in the construction and arrangement of the fastening device may be made by those skilled in the art without departing from the spirit and scope of the appended claims.

I claim:

1. A unitary, one-piece push-on type fastening device made of a resilient sheet metal material having spring-like characteristics and adapted for securement with a stud comprising:

a body including oppositely disposed end portions connected together by relatively thin opposed bridge portions defining therebetween a centrally disposed elongated slot extending lengthwise thereof;

said slot being generally rectangular in configuration in top plan being defined along said bridge portions by two parallel side edges;

a pair of spaced, oppositely disposed, resilient initially inclined fingers disposed adjacent one end of said slot in overlying relation thereto and extending angularly upwardly and inwardly from said side edges;

said fingers extend substantially to the medial portion of said slot and are greater in length than the transverse dimension of said stud to provide an effective contact with said stud;

said fingers including spaced, generally parallel lower opposed edges defining a reduced width portion for said slot with the transverse distance between said lower opposed edges being less than the maximum transverse dimension of said stud and adapted for bighting engagement with said stud to enable resilient gripping engagement of said device with said stud upon movement in a generally axial direction with respect to the longitudinal central axis of said stud;

the other end of said slot defining an enlarged width portion with maximum transverse dimension thereof being greater than the maximum transverse dimension of said stud to enable disengagement of said device from said stud upon lateral shifting movement of said device with respect to said stud;

said body including an upturned flange extending angularly upwardly and outwardly from one end of said body remote from said fingers for facilitating lateral shifting of said device to dispose said stud in said enlarged width portion for upward axial movement of said device with respect to said stud enabling disengagement of the device from said stud;

said body being arched in a generally concavo-convex curved configuration, in side elevation, with the juncture of said flange with said body and the opposed end of said body adapted for resilient bearing engagement with a support member; and wherein the lower opposed edges are generally arcuate in configuration in the lengthwise direction adapted to engage said stud along an arcuate line to form abutments to prevent lateral shifting movement of the device with respect to the stud.